Fig.1

3,660,277
OXYGENATION-OZONATION OF BOD-CONTAINING WATER
John R. McWhirter, Westport, Conn., and Ernest K. Robinson, West Liberty, W. Va., assignors to Union Carbide Corporation, New York, N.Y.
Continuation-in-part of abandoned application Ser. No. 52,196, July 7, 1970. This application May 17, 1971, Ser. No. 144,243
Int. Cl. C02c 1/06
U.S. Cl. 210—6          16 Claims

ABSTRACT OF THE DISCLOSURE

BOD-containing water such as sewage is biochemically treated with oxygen and the liquid effluent is disinfected by chemical treatment with ozone while simultaneously fortifying the effluent with dissolved oxygen.

CROSS REFERENCE TO RELATED APPLICATIONS

This application is a continuation-in-part of Ser. No. 52,916, filed July 7, 1970 in the names of John R. McWhirter and Ernest K. Robinson, and now abandoned.

BACKGROUND OF THE INVENTION

This invention relates to a system for biochemically treating BOD-containing waste water such as municipal sewage by oxygenation, and disinfecting the effluent from this treatment by chemical treatment with ozone while simultaneously fortifying the effluent with dissolved oxygen.

A common method for treating sewage to remove pollutants is by the activated sludge process. According to this process, the sewage, with or without primary clarification, is thoroughly mixed with oxygen-containing gas in the presence of aerobic bacteria. The organic matter contained in the water is absorbed and biologically oxidized by the bacteria. Subsequently, the bacteria are separated, e.g., by gravity settling, the purified effluent is decanted then disinfected by chlorination and discharged into a receiving stream or body of water.

While the activated sludge process is one of the most effective and economic waste water treatment processes available today, it does not achieve complete purification. The effluent, e.g., from a municipal activated sludge treatment plant, will contain residual oxidizable material (Chemical Oxygen Demand or COD) including biodegradable organic matter representing residual Biological Oxygen Demand (BOD). In a well-operated unit, most of the BOD fed to the activated sludge secondary treatment system will be assimilated by the aerobic bacteria therein and most of the residual BOD in the effluent will consist of highly disperse bacteria which escaped sedimentation and removal. Of major importance is the fact that these bacteria include potentially pathogenic forms and their discharge into public waters may promote the spread of communicable diseases. Disinfection is therefore required by public health laws before treatment plant effluents are discharged to receiving waters. This is usually accomplished by chlorinating agents which have an effective bactericidal action.

It is well known to "polish" or post-treat effluents with ozone as an alternative to chlorination, or more exactly with air or oxygen containing a few percent of ozone. The oxidation of impurities in water with ozone is a nonbiological chemical reaction, in contrast to the oxidation of such materials with oxygen in the activated sludge process, which results from a biochemical reaction. The bactericidal properties of ozone are well known and it is now employed for sterilization of drinking water particularly in Europe. In the few instances where its use has been associated with waste treatment, it is normally the intent to reduce substantially the residual BOD and COD by chemical oxidation with ozone, i.e., to a degree far beyond that required for bacterial kill alone. In fact, it has been assumed that when significant COD is present, such gross removal of COD is a necessary accompaniment, if not a prerequisite, to bacterial kill.

In some attempts to disinfect, water has been treated with massive dosages of ozone mixed with air or oxygen containing 25% ozone or higher content. Such use of ozone is impractical and uneconomic. Ozone generators are usually of the silent electric discharge type and exhibit sharp variation in efficiency with $O_3$ product concentration. With pure oxygen feed, such generators usually operate most efficiently at output of about 1.5 to 2.0% $O_3$. Production of about 4.0% $O_3$ is feasible but higher concentrations entail increasingly severe economic penalty. Dosing the waste treatment effluent with enough ozone to oxidize a substantial residue of COD or BOD is not feasible because of the high cost. Not only is the $O_3$ expensive, but the cost of the tankage and agitation needed to retain and mix the water for a period of time sufficient to dissolve and utilize such quantity of $O_3$ is excessive. As a means for removing BOD and COD from effluents, ozonation does not compare with the effectiveness of other available procedures, e.g. carbon adsorption. Massive treatment with $O_3$ is also apt to entail detectable loss of $O_3$ from the system. This is highly undesirable because $O_3$ is toxic, is harmful to vegetation and has a disagreeable odor.

However, if the gas used to post-treat the activated sludge system's effluent is held below an $O_3$ concentration of 4.0%, a great quantity of carrier gas must be used to apply the $O_3$ to the water. If air is used as the oxygen source and as the carrier gas, the carrier gas is available for the cost of its compression and mixing. But producing $O_3$ from air requires a relatively large investment in ozone generators and requires about twice the power as with pure oxygen feed. Moreover, air contains only about 20% $O_2$ which is a severe disadvantage in one important respect, as explained below.

In addition to "polishing" or disinfecting the effluent, it is usually desirable to fortify it with dissolved oxygen (DO). This is done so as to provide a quantity of dissolved oxygen along with the effluent which approaches or attains a value equivalent to any BOD or COD still remaining in the effluent. The object is to prevent such BOD and COD from contributing toward an oxygen-deficient condition in the receiving stream. In some instances, an additional amount of dissolved oxygen is also desirable over and above that which is required to satisfy the residual BOD or COD of the effluent. This additional DO is desired so as to actually improve the quality of the receiving water above the level it would possess absent the discharge of effluent. This is in recognition of the fact that natural waters receive pollution from sources other than a "closed" sewage system, e.g., run-off of rainwater, effluent upstream and downstream of the municipal boundaries, and unauthorized "dumping" or drainage of pollution within the municipality.

The level to which the effluent can be economically fortified with DO is very limited when air is used as the oxygen source. By way of example, if it is assumed that the DO level of the effluent is raised with air to 7 p.p.m. (mg./l.) and that the effluent flow rate is 5% of that of the receiving stream, combining the two streams will only increase the DO level by about 0.35 p.p.m. At one atmosphere pressure and room temperature (20° C.), the saturation level of oxygen (from air) in water is about 9 p.p.m. and even this low equilibrium DO level cannot be closely approached without excessive operating cost.

If pure oxygen is used as the exygen source for ozone production (and as the carrier gas), then the maximum saturation DO level will be about 45 p.p.m. (at normal temperature and pressure). In the foregoing example, sufficient DO can be provided to the stream via the effluent to produce significant improvement. However, the 4.0% limitation previously mentioned on the permissible $O_3$ concentration of the carrier gas (based on the economics of $O_3$ generation) means that a very large volume of oxygen will be required. In fact, so much $O_2$ is needed as $O_3$ carrier that only about 20-35% of the total $O_2$ can be utilized both for $O_3$ production and for DO enrichment. The remainder would be wasted from the post-treatment step. To avoid such waste, it has been proposed by the prior art to recover the $O_2$ undissolved in the post-treatment and recirculate it back to the ozone generator and to the ozone-effluent contactor. However, this undissolved spent gas is saturated with water and must be dried before recirculation through the $O_3$ generator. Moreover, it contains large quantities of $CO_2$ and $N_2$ which were stripped by the gas from the effluent in the post-treatment. Unfortunately the removal of $N_2$, $CO_2$ and water from spent gas to accommodate its recirculation is very expensive and impractical. If these components are not removed, they will seriously suppress the oxygen partial pressure and dilute the advantage of using pure oxygen in the ozone generator. Moreover, the presence of impurities seriously reduces the efficiency of the ozone generator.

As a result of the foregoing constraints on the use of ozone for post-treatment of effluents, it has usually been found more practical and economical to employ chlorine as a disinfecting agent, even though it has long been recognized that ozone offers several attractive advantages.

It is an object of this invention to provide an improved method of and apparatus for treatment of BOD-containing waste water such as municipal sewage, which discharges to receiving waters, a disinfected product of negligible BOD content but with significantly higher DO than the receiving waters.

Another object is to provide an improved system of significantly greater efficiency than heretofore employed for such a product, including biochemical reaction between organic matter and oxygen in an activated sludge treatment section and chemical reaction between bacteria (in the effluent) and ozone in an ozonation section.

Still another object is to provide an improved oxygenation-ozonation waste treatment system characterized by an ozonation at the low concentration level of greatest efficiency for presently available ozone generators, yet by effective utilization of the oxygen undissolved in the ozone contactor.

Other objects and advantages of this invention will be apparent from the ensuing disclosure and appended claims.

SUMMARY

This invention relates to a method of and apparatus for treating BOD-containing waste water first by oxygenation in contact with activated sludge, then by ozonation of the effluent from the oxygenation.

In water disinfection, it is not the percent bacterial kill that is critical, but rather the actual count of bacteria remaining in the treated water. The percent kill does not define the purity of water after disinfection because the level of infection of the water before disinfection varies widely. A claimed bacterial kill of 99.99% might be acceptable under some circumstances but unacceptable in others. Purity standards for treated water based on cell count vary widely among localities. As a rough rule-of-thumb, the following order of magnitude values of coliform cell count per 100 milliliter indicate generally encountered purity levels:

Effluent from secondary treatment ____ $\sim 10^6$
Public water (lakes, streams) ____ $\rightarrow 5 \times 10^3$
Swimming pools ____ $\rightarrow 1 \times 10^2$
Drinking ____ $\rightarrow 1$ The total bacterial cell count, (usually expressed as number of cells per milliliter of sample) is not as significant as the number of coliform bacteria present in the water. The total cell count is comprised mostly of soilform bacteria not considered harmful, and will usually exceed the coilform count. The coliform bacterial count is strongly indicative of the degree of pollution resulting from sanitary sewage, hence, the degree of potential infection by pathogenic bacteria. Coliform counts are usually reported in numbers per 100 ml. sample.

"Disinfection" is a step often used in the treatment of water intended for drinking purposes. In the present invention, the disinfection step is applied to effluent from a sewage treatment plant so as to avoid unacceptable contamination of natural streams and lakes.

The present invention provides a system for employing both ozone and oxygen economically, safely and effectively for the disinfection and DO-enrichment of effluent. According to this invention, an activated sludge step for the treatment of BOD-containing waste water employs oxygen-rich gas for aeration and delivers an effluent which is low in BOD, yet contains substantial quantities of bacteria potentially injurious to health, e.g. $10^3$ to $10^7$ total bacteria per milliliter or $10^3$ to $10^6$ coliform bacteria per 100 milliliters.

The effluent from the activated sludge step is subsequently contacted with an ozone-oxygen gas mixture in an efficient gas-liquid contactor wherein the $O_3$ content of the gas is depleted and a spent gas containing at least 60% oxygen is withdrawn. The spent gas is passed to the activated sludge step and comprises at least a major portion of the oxygen-rich gas used for aeration. The effluent delivered from the system is disinfected and is fortified with dissolved oxygen. The vent gas from the activated sludge step contains at least 20% oxygen but not more than 70% oxygen, and the oxygen content thereof represents not more than 40% of the total oxygen fed to the system.

More particularly, a method aspect of this invention includes mixing BOD-containing waste water with activated sludge and feed gas which comprises at lower 60% oxygen (by volume) in an oxygenation zone and for sufficient duration to form oxygenated liquor. Waste gas is then discharged from the oxygenation zone, containing 20-70% oxygen (by volume) and comprising no more than 40% (by volume) of the total oxygen fed to the system. Oxygenated liquor is also discharged from this zone and separated into effluent and sludge, at least part of the latter being recycled to the oxygenation zone as the activated sludge.

Only externally supplied gas comprising at least 75% oxygen (by volume) is introduced to an ozone generation zone, as for example the silent electric discharge type, and sufficient ozone is formed therein to produce a gas mixture containing 0.5-4% ozone (by volume). The liquid effluent from the oxygenated liquor separation, and the ozone-oxygen gas mixture are mixed in a post-treatment zone for 2.5-20 minutes and in relative quantities such that at least 2 parts ozone are dissolved per $10^6$ parts effluent by weight.

Disinfected product water is discharged from the post-treatment zone having 10-60 p.p.m. higher dissolved oxygen content than the effluent from the oxygenated liquor separation. Spent gas is discharged from the post-treatment zone which is substantially ozone-free and comprises at least 60% oxygen (by volume). At least part of this spent gas is introduced to the oxygenation zone as at least the major quantity portion of oxygen in the feed gas. That is, the spent gas so introduced comprises more than 50% (by weight) of the oxygen introduced to the oxygenation zone as the feed gas.

In an apparatus aspect of this invention, an oxygenation chamber is provided with a gas-tight cover, and separate means are provided for introducing: (1) the oxygen feed gas, (2) waste water, and (3) activated sludge to the chamber. Means are included in the oxygenation chamber for mixing these three streams to form oxygenated liquor, and other means are provided for withdrawing the liquor from the chamber. A clarifier joins the liquor withdrawal means to separate the oxygenated liquor into effluent and sludge. Sludge withdrawal means from the clarifier are joined to the activated sludge inlet means to the oxygenation chamber for recycling at least part of the sludge thereto. Waste vent gas means are provided in communication with the oxygenation chamber gas space (remote from the oxygen feed gas means thereto) to release unconsumed oxygen-containing gas.

An ozone generator is used with only external oxygen gas supply means thereto, i.e. no means for recyling spent gas from the liquid-gas post-treatment contact means. Passage means are provide for flowing ozone-oxygen gas mixture from the ozone generator to the post-treatment contactor, and also passage means for flowing effluent from the clarifier thereto. Disinfected product discharge means join the liquid-gas post-treatment contact means, and may in turn communicate with a larger body of water to which the disinfected product is introduced.

Means are also provided for discharging spent oxygen-containing gas from the liquid-gas post-treatment contact means, which discharge means are joined to the aforementioned separate means for introducing oxygen feed gas to the oxygenation chamber. This apparatus facilitates recovery of the oxygen unconsumed in the ozone post-treatment for consumption in the aeration of waste water entering the oxygenation chamber.

BRIEF DESCRIPTION OF THE DRAWINGS

FIG. 1 is a schematic view of aparatus according to one embodiment of the invention which may be used to practice the instant oxygenation-ozonation method;

DESCRIPTION OF THE PREFERRED EMBODIMENTS

Figure 1:
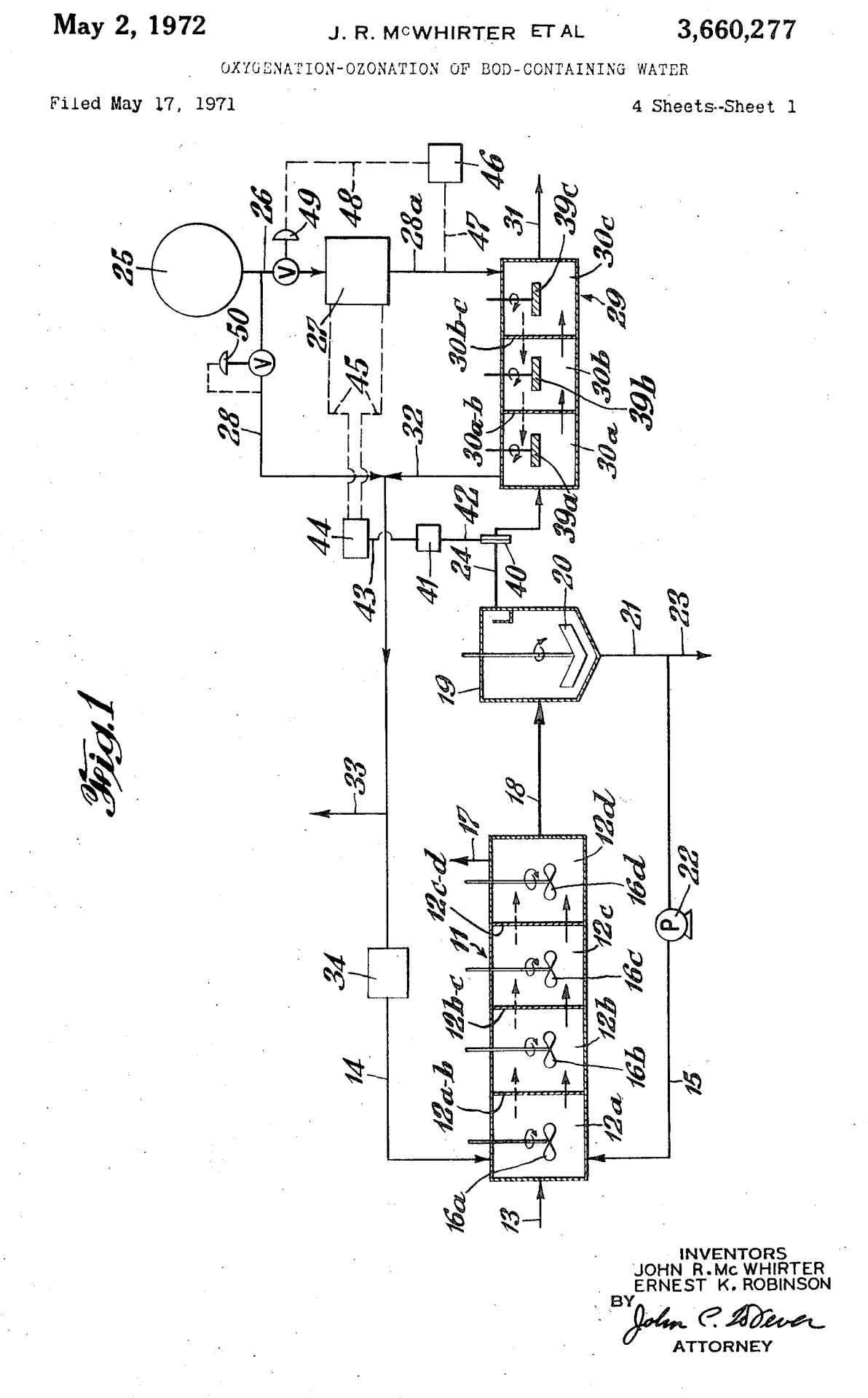
Figure 2:
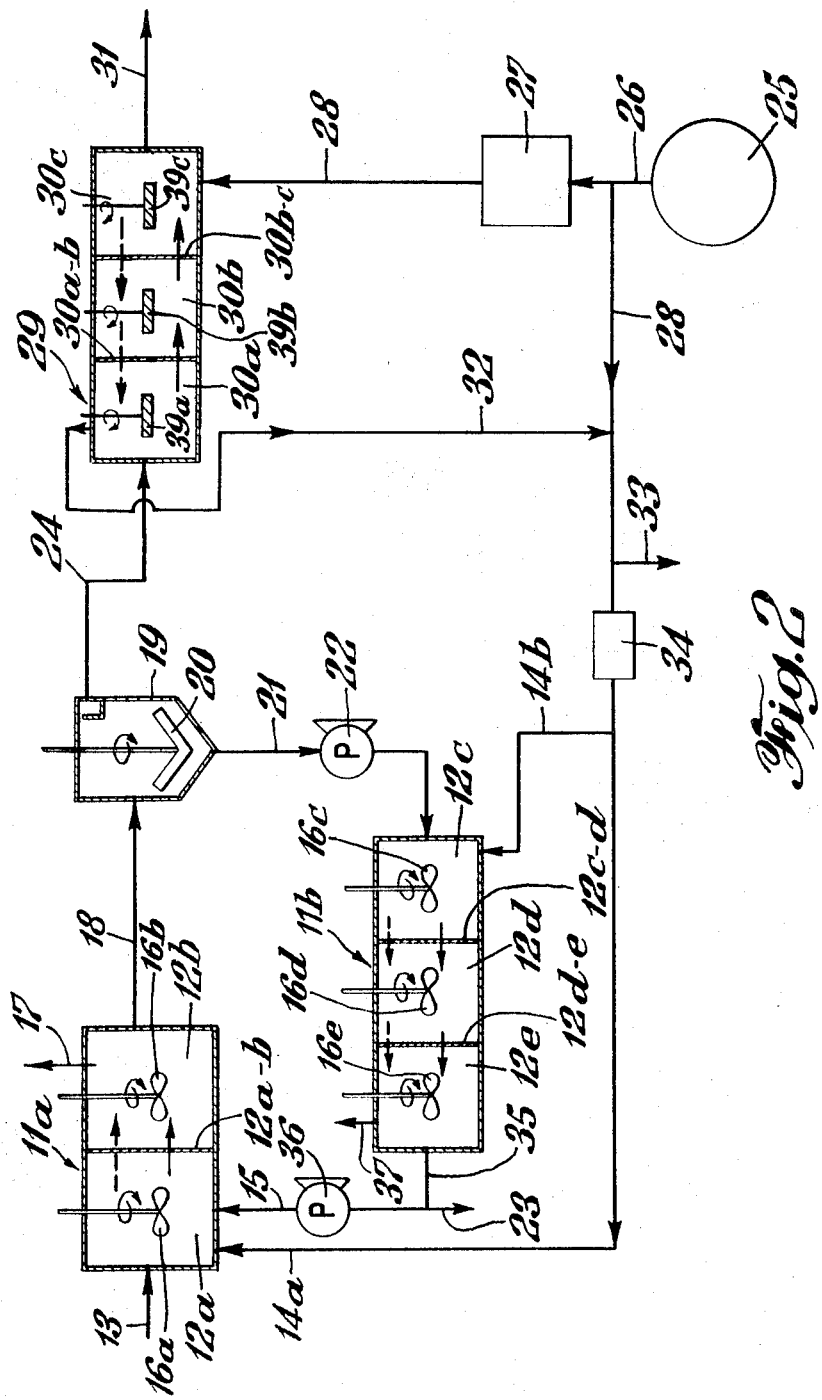
FIG. 2 is a schematic view of another apparatus embodiment including components for contact stabilization.

Referring now to the drawings, FIG. 1 shows oxygenation chamber 11 which preferably comprises several compartments 12a, 12b, 12c and 12d divided by partitions 12a–b, 12b–c, and 12c–d. BOD-containing waste water is introduced to compartment 12a through conduit 13 and oxygen feed gas is fed thereto through conduit 14. Activated sludge is also introduced to first compartment 12a by conduit 15. These three components are mixed, as for example by propeller 16a. The resulting first oxygenated liquid-solid is passed into second compartment 12b for mixing with first unconsumed oxygen-containing gas flowed from first compartment 12a. The oxygen-containing gas and oxygenated liquid-solid are preferably flowed cocurrently in an analogous manner to third compartment 12c and fourth compartment 12d. The necessary passages for these flows may for example be provided in partitions 12a–b, 12b–c, and 12c–d (as will be understood by those skilled in the art), and the flows are schematically illustrated as solid arrows (liquid-solid) and dashed arrows (gas). Waste gas, comprising 20–70% oxygen (by volume) is vented from the last oxygenation compartment 12d through conduit 17. This waste gas is a relatively small quantity, e.g. 0.05–0.40 of the feed gas volume introduced through conduit 14. Accordingly, a waste gas containing as much as 70% oxygen does not represent an important loss of oxygen.

The waste gas contains no more than 40% of the total oxygen fed to the activated sludge and post-treatment (as $O_2$ or $O_2$ converted to $O_3$). The $O_3$ is virtually completely consumed in the chemical oxidation of the post-treatment zone, and a portion of the $O_2$ introduced to the zone is dissolved in the effluent to appear as DO in the disinfected product water. The remaining $O_2$ is discharged from the post-treatment zone in the spent gas, and at least a major portion thereof is passed to the oxygenation zone. The use of at least 60% oxygen as the aeration gas in chamber 11 together with certain other process conditions permit high oxygen utilization in the oxygenation step, and loss of no more than 40% of the total oxygen in the waste gas. These conditions preferably include introducing 0.06–0.40 lb. moles per hour of oxygen to first compartment 12a per one horsepower of mixing and gas-liquid contact energy used in all compartments of chamber 11, and preferably maintaining the volatile suspended solids content (MLVSS) of waste water-activated sludge in 12a at least at 3000 p.p.m. The aforedescribed multiple stage, cocurrent gas and liquid-solid flow system for oxygenation of waste water does not comprise part of this invention, but is described more completely and claimed in copending application Ser. No. 838,500 filed July 2, 1969 in the name of John R. McWhirter (incorporated herein to the extent pertinent) and issued Dec. 15, 1970 as U.S. Pat. No. 3,547,815.

The oxygenated liquor is discharged from chamber 11 through conduit 18 to clarifier 19 into effluent liquid and activated sludge. Clarifier constructions are well-known and may for example include rotatable scraper 20 at the lower end to prevent coning. The activated sludge is withdrawn through bottom conduit 21 and at least a portion thereof is recycled through pump 22 and conduit 15 to first compartment 12a of chamber 11. Any portion of the sludge not required for such recycling may be discarded through conduit 23. The effluent water is discharged from clarifier 19 through conduit 24, with less than 50 p.p.m. $BOD_5$ and 0–20 p.p.m. dissolved oxygen (DO). Preferably, the effluent from the clarifier contains less than 35 p.p.m. $BOD_5$ and contains 5–15 p.p.m. DO. These levels of BOD removal and DO concentration are readily attainable in the multiple oxygenation stage cocurrent flow system previously described.

Numerical values of BOD given herein are 5-day incubations and therefore are values of $BOD_5$ unless otherwise specifically identified.

Preferred process conditions to achieve high solids concentrations and appreciable DO content in oxygenation chamber 11, high settling rate and high sludge density in clarifier 19, and low sludge recycle rate are described and claimed in copending application Ser. No. 838,498 filed July 2, 1969 in the names of John R. McWhirter and Ernest K. Robinson (incorporated herein to the extent pertinent) and issued Dec. 15, 1970 as U.S. Pat. No. 3,547,813.

Only externally supplied gas having at least 75% oxygen (by volume) and preferably at least 85% $O_2$ is supplied by storage container 25 (or alternatively by an on-site oxygen gas generator) through conduit 26 to ozone generator 27 which may for example be the commonly used silent electric discharge type. Spent gas from ozone post-treatment is not recycled to $O_3$ generator 27 because of the aforementioned $N_2$, $CO_2$ and water contamination and its adverse effect on the generator. The oxygen content of the externally supplied gas will usually not drop more than 15 percentage points in transit through the post-treatment step. Therefore the spent gas will contain at least 60% $O_2$ and preferably at least 70% $O_2$. Relatively high $O_2$ purities are desired for the externally supplied gas in order to obtain good efficiency in the ozone generator and to obtain high partial pressure of oxygen and high rate of oxygen solution in the ozone contactor. Also this oxygen purity insures that the spent gas from the post-treatment will have the relatively high $O_2$ concentration needed to achieve the advantages of oxygen instead of air aeration in the scondary treatment activated sludge step.

An ozone-oxygen gas mixture having 0.5–4% $O_3$ (by volume) is formed in ozone generator 27 and discharged through conduit 28a. Ozone concentrations below 0.5% do not provide adequate dosages to efficiently disinfect the clarified effluent from conduit 24, without simultaneously requiring excessive amounts of oxygen which cannot be utilized in the system even at high BOD feed strengths up to 400 p.p.m. Ozone concentrations above 4% seriously reduce the ozone production efficiency of generator 27 and may create a safety hazard. In addition, the required ozone dosage would be obtained with a relatively low amount of carrier oxygen so that the partial oxygen pressure in the post-treatment step would be undesirably more severely suppressed by gaseous impurities. A gas mixture containing 1–3% ozone (by volume) represents a preferred range based on the aforediscussed considerations.

When relatively high ozone concentrations within this range are employed the quantity of oxygen available for consumption in the spent gas is reduced thereby increasing the probability that make-up oxygen will be needed. In the latter event, make-up oxygen may be diverted from conduit 26 through branch conduit 28 upstream ozone generator 27. Conduit 28 joints spent gas in conduit 14 as the oxygen-rich feed gas to oxygenation chamber 11.

The ozone-oxygen gas mixture in conduit 28a is fed to liquid-gas contacting chamber 29 for mixing with the clarified effluent introduced by conduit 24 to the post-treatment zone. Chamber 29 preferably comprises several compartments 30a, 30b and 30c divided by partitions 30a–b and 30b–c. In contrast to oxygenation chamber 11 where the gas and liquor preferably flow cocurrently, the $O_2$–$O_3$ gas mixture and the clarified effluent water preferably flow countercurrently in chamber 29. Countercurrent flow is particularly advantageous when it is desired to fortify the DO in the effluent to a level in excess of 20 p.p.m. If a lower DO level is adequate, cocurrent flow of gas and liquid may be entirely satisfactory.

For the illustrated countercurrent operation, effluent water is introduced to first compartment 30a and successively flows through an opening in partition 30a–b to second compartment 30b, thence through an opening in partition 30b–c to third compartment 30c (see solid arrows for liquid flow). Simultaneously the gas mixture flows progressively from third compartment 30c through an opening in partition 30b–c to second compartment 30b and thence through an opening in partition 30a–b to first compartment 30a. As there is no significant quantity of solid matter in post-treatment chamber 29, mixing means (analogous to propellers 16a, 16b and 16c of oxygenation chamber 11) are not required. The gas may be aerated into the liquid by any of several well-known means, as for example subsurface spargers or surface aerators 39a, 39b and 39c.

As previously indicated, sufficient ozone should be introduced to chamber 29 relative to the effluent so that at least 2 and preferably 2–8 parts $O_3$ are dissolved per $10^6$ parts of effluent by weight. This dosage is preferably only sufficient to disinfect the effluent. Certain impurities in the oxygenation zone effluent at specific locations may react rapidly enough with $O_3$ to create a competitive consumption of $O_3$. In this instance a reduced fraction of the supplied $O_3$ is utilized for bacteria kill and larger dosages are needed to achieve a desired degree of sterilization. Tests have shown that in the absence of such $O_3$-consuming impurities, significant disinfection is realized at dosages as low as 2 p.p.m. whereas lower dosages do not satisfy existing regulatory standards. Also in the absence of $O_3$-consuming impurities, an excessive concentration of ozone in chamber 29 above 8 p.p.m. $O_3$ unnecessarily increases the possibility of $O_3$ carryover in the spent gas to the oxygenation chamber 11 where it would poison the bacteria necessary for the biochemical oxidation therein. Moreover, experience has shown that dosages above 8 p.p.m. are not required to meet even the more stringent waste water treatment standards (absent $O_3$-consuming impurities) and therefore the application of heavier dosages would constitute an unnecessary expense.

The effluent and ozone-oxygen gas are contacted in post-treatment chamber 29 for 2.5–20 minutes effluent liquid residence time. Liquid contact times of less than 2.5 minutes are not sufficient to simultaneously achieve economically the required level of 2 parts $O_3/10^6$ parts effluent, and the required degree of dissolved oxygen enrichment. Moreover, the dissolved ozone level obtained in the effluent in chamber 29 must be maintained for a sufficient time for bacterial kill to occur. Once the effluent is discharged into receiving water, the dissolved ozone level will be reduced by dilution to essentially zero and the $O_3$ consumed uselessly in the destruction of bacteria which potentially are non-pathogenic. Contact times of greater than 20 minutes require unnecessarily large chambers for holding the effluent during post-treatment. The effluent liquid residence time in post-treatment zone 29 is preferably not more than 0.33 of the liquor residence time in oxygenation zone 11. By way of illustration, if the latter is 60 minutes, the former is preferably no more than 20 minutes. In the apparatus aspect of the invention, the liquid capacity of the liquid-gas contact means (the post-treatment zone) 29 is preferably no more than 0.33 of the liquid capacity of oxygenation chamber 11 (the oxygenation zone). Both the foregoing liquid residence time ratio and the liquid capacity ratio reflect an advantage of this invention in that chemical oxidation of BOD and COD by ozone is not relied upon to any appreciable extent in the post-treatment zone. Accordingly, the liquid-residence time and liquid capacity may be only a small fraction of that required in the oxygenation zone. This of course represents an appreciable saving over prior art systems wherein the ratios are much higher.

Disinfected product water is discharged from third compartment 30c of post-treatment chamber 29 through conduit 31, having 10–60 p.p.m. and preferably 10–40 p.p.m. higher dissolved oxygen content than the clarified effluent in conduit 24. Accordingly, this product has a DO level which approaches or achieves a value equivalent to any still remaining BOD or COD which could otherwise contribute toward an oxygen-deficient condition in the receiving stream. The 10 p.p.m. lower limit of this ΔDO range is based on the objective of significant $O_2$ fortification of the oxygenation zone effluent, and the 60 p.p.m. upper limit is based on the maximum $O_2$ solubility in the disinfected product water as possible operating temperatures and pressures, i.e. 10° C. and 15 feet liquid head (1.5 atmospheres pressure in a vertical contacting column as the ozonation chamber 29). The preferred 40 p.p.m. upper limit for ΔDO is based on the cost of excessive oxygen fortification.

The spent gas is discharged from first compartment 30a in conduit 32 in substantially ozone-free condition and comprises at least 60% oxygen (by volume). The impurities in this spent gas are primarily carbon dioxide formed during the oxygenation-activated sludge step, and nitrogen present in solution in the incoming waste water. At least a portion of the impurities remain in solution through clarifier 19 and are carried by the effluent to the ozonation chamber 29 where they are displaced by oxygen into the spent gas.

As a qualitative relation between the ozone concentration in the mixture entering post-treatment chamber 29 and the oxygen concentration in the spent gas discharged therefrom, if the $O_3$ concentration is high and approaches 4% (by volume), then the spent gas will be low in quantity and oxygen purity. However, the lower the $O_2$ quantity and purity of the spent gas, the greater will be the amount (and possibly the purity) of make-up oxygen added to meet the $O_2$ requirements in the activated sludge step, including a combination feed gas purity of at least 60% $O_2$ in conduit 14. Oxygen purity blow 60% (by volume) in the oxygenation step does not afford the advantages of high energy transfer efficiency, high oxygen utilization efficiency, and smaller equipment as compared to conventional air aeration.

In the event more oxygen is available in the spent gas than can be consumed in oxygenation chamber 11, a controlled portion thereof may be diverted to conduit 33 for removal from the system. Alternatively the total quantity of spent gas may be conducted through chamber 11 and the excess vented through conduit 17. Under such circumstances, there would be no flow of make-up oxygen through conduit 28 to conduit 14.

If carbon dioxide buildup in the system is a problem, means may be provided for removing $CO_2$ from either the spent gas in conduit 14 or the clarifier effluent liquid in conduit 24. As illustrated, selective adsorption trap 34 is provided in conduit 14 for this purpose.

In a preferred embodiment wherein externally supplied make-up gas is supplied to the oxygenation zone 11, this gas comprises at least 85% oxygen (by volume), the spent gas discharged from post-treatment zone 29 in conduit 32 comprises at least 70% oxygen (by volume), and the waste gas discharged from the oxygenation zone comprises no more than 30% (by volume) of the total oxygen fed to this zone and zone 29.

Suitable means for controlling the oxygenation-ozonation system of this invention are illustrated in FIG. 1. Orifice 40 in the clarifier effluent conduit 24 senses the liquid flow rate and controller 41 generates a signal through 42 which varies with the flow rate. A signal is also directed through 43 to controller (e.g. voltage regulator) 44 which varies the electric power through conductors 45 to ozone generator 27. Thus, the quantity of ozone (lb./hr.) produced by generator 27 is made proportional to the liquid flow rate in clarifier effluent conduit 24 to the post-treatment zone 29. An output signal adjustment associated with controller 41 allows the $O_3$ dosage level to be preselected.

Ozone analyzer-controller 46 senses the $O_3$ concentration of the gas leaving generator 27 by signal receiving means 47. Controller 46 may be set to maintain a predetermined optimum concentration of $O_3$ in conduit 28a, and a signal is generated by the controller which is proportionate to a change in $O_3$ concentration from the set point. This signal is transmitted through means 48 to adjust valve 49 in oxygen supply conduit 26 to generator 27, admitting more $O_2$ if the $O_3$ concentration rises and reducing the flow if the $O_3$ concentration falls. Spent gas discharged from post-treatment zone 29 through conduit 32 is directed to oxygenation zone 11 by joining conduit 14. If this flow of spent gas is insufficient to meet the oygen requirement in zone 11, the pressure in conduit 14 will drop. Valve 50 in the $O_2$ bypass conduit 28 then opens automatically to restore a preset downstream pressure.

It may be desirable to maintain positive control over the DO level in the purified water leaving the post-treatment zone in conduit 31. In this event, the DO level may be sensed in the final liquid contact stage 30c.

Another embodiment of this invention is illustrated in FIG. 2 with components similar to or identical with FIG. 1 being identified by the same reference number. This embodiment differs in certain particulars from FIG. 1, to be described in detail. The oxygenation zone of FIG. 2 has two sections: BOD absorption section 11a and BOD assimilation section 11b. Each section receives a portion of the spent gas discharged from post-treatment chamber 29, i.e. through conduits 14a and 14b. This spent gas comprises at least 60% oxygen (by volume) for previously stated reasons.

Incoming BOD-containing waste water is fed to first compartment 12a of section 11a for mixing activated sludge introduced through conduit 15 and with the oxygen feed gas fed through conduit 14a, and thereafter for mixing in second compartment 12b by cocurrent flow of gas and liquor thereto. The liquor residence time in section 11a is preferably only 15–60 minutes, depending upon the strength and absorptivity of the BOD in the waste water, and is only sufficient for absorption of BOD by the biomass. The partially oxygenated liquor from section 11a is separated in clarifier 19 into the effluent which is discharged through conduit 24, and BOD-enriched sludge withdrawn through conduit 21 and circulated by pump 22 to first compartment 12c of BOD assimilation-sludge stabilization section 11b.

The BOD-enriched sludge is mixed with oxygen-rich spent gas introduced through conduit 14b and the fluids pass consecutively through second compartment 12d and third compartment 12e for additional cocurrent contact and mixing. Alternatively, the gas and sludge may flow countercurrently through compartments 12c, 12d and 12e. The contact-residence time of the fluids in section 11b is sufficient for assimilation of the absorbed BOD by the sludge, e.g. 45–300 minutes. The resulting activated sludge is withdrawn from third compartment 12e into conduit 35 and recycled by pump 36 through conduit 15 to first compartment 12a of BOD absorption section 11a. Any excess activated sludge not needed in section 11a of the oxygenation zone is discarded through conduit 23. Waste gas from BOD-assimilation section 11b is vented from third compartment 12e through conduit 37.

The remarkable oxygen economy of the system is achieved by a fortuitous and unobvious matching of the oxygen requirements for ozone disinfection and for DO-enrichment on one hand, and the oxygen requirements for purification by biochemical oxygenation in the activated sludge step (on the other hand). This matching is in part due to the very high oxygen utilization efficiency and remarkably complete removal of BOD which are achievable when oxygen is effectively used in the oxygenation-activated sludge step. This matching can be illustrated by the following example:

Ten million gallons per day of sewage containing 220 p.p.m. BOD (a medium strength waste water) is fed to an activated sludge step of the multistage, cocurrent flow type (FIG. 1) and is contacted therein with oxygen-rich gas. The provision of mixing energy, biomass, oxygen and tank volume (retention time) is sufficient to remove more than 90% of the BOD. The oxygenated liquor is separated and an effluent containing 20 p.p.m. BOD and 5 p.p.m. DO is withdrawn from the clarifier. The effluent is then further contacted in a post-treatment zone with a 3% ozone–97% oxygen gas mixture and in relative quantities as to provide 5 parts ozone per $10^6$ parts by weight of effluent. This further contacting may be accomplished in a multistage contercurrent contactor generally of the FIG. 1 type and the mixing energy input and tank volume are sufficient to increase the DO level of the effluent to 40 p.p.m. Owing to its high solubility relative to oxygen and to the efficient mass transfer obtained in the multi-stage contactor, substantially all of the ozone in the gas is absorbed and a spent gas is withdrawn from the post-treatment zone containing less than 1 p.p.m. $O_3$. This spent gas containing about 85% oxygen (balance principally $CO_2$ and $N_2$) is used as the major part of the oxygen-rich gas introduced into the activated sludge step. Due to the essentially complete removal of $O_3$ from the spent gas in the post-treatment ozonation zone, the active biomass in the oxygenation-activated sludge step is not killed or damaged when the substantial $O_2$ residue is reused.

The dosage of 5 parts $O_3/10^6$ parts effluent in the post-treatment zone requires 417 lb. $O_2$/day to supply the $O_3$ for treating 10 million gallons per day (m.g.d.) effluent. If the gas mixture to the ozone contactor is 3% $O_3$, the total $O_2+O_3$ fed is $417/.03=13,900$ lb./day. Increasing the DO-level from 5 to 40 p.p.m. will require 2920 lb. $O_2$/day. The total $O_2$ utilized in ozone treatment (either as $O_2$ or $O_3$) is therefore $417+2920=3337$ lb./day. Therefore, the fraction of $O_2$ utilized for conversion to (and consumption as) ozone and raising the DO level of the effluent is $3337/13,900=24.0\%$. It is reasonable to conclude that this low utilization has discouraged the prior art's use of $O_2$ as a source of $O_3$ in waste treatment. That is, utilization of only about ¼ of the supplied $O_2$ could not be economically justified, and since recycling of the excess oxygen to the ozone generator was impractical, the remainder or ¾ of the supplied $O_2$ would be wasted.

In this example, the spent gas delivered from the ozone contactor still contains $13,900-3337=10,563$ lb. $O_2$/day and according to the present invention this gas is delivered back to theoxygenation-activated sludge step. In the latter step, removal of $220-20=200$ p.p.m. BOD requires about 16,680 lb./day oxygen feed, assuming 90% $O_2$ utilization in that step. It is evident that in this particular example, the $O_2$ requirement in the activated sludge step is greater than the unconsumed $O_2$ from the ozone treatment step. The $O_2$ deficiency, $16,680-10,563=6117$ lb./day is made up as fresh $O_2$ addition to the oxygenation-activated sludge step.

The system of this invention is of course capable of many modes of operation other than the foregoing example. For instance, if the incoming waste water (10 m.g.d.) contains 110 p.p.m. BOD (a low strength waste water) and the clarifier effluent contains 10 p.p.m. BOD (>90% removal), then about 8349 lb. $O_2$ will be required in the oxygenation-activated sludge step, assuming 90% $O_2$ utilization in that step. If the effluent is treated with 3% $O_3$ —97% $O_2$ gas and the $O_3$ dosage is 3 parts/$10^6$ parts effluent, then 250 lb. $O_3$ will be required in post-treatment. The total $O_3+O_2$ fed to post-treatment is $250/.03=8330$ lb./day. Assuming that the DO level is again raised from 5 to 40 p.p.m. in post treatment, the $O_2$ requirement for this purpose is 2920 lb./day as before. Thus, the fraction of $O_2+O_3$ utilized in post-treatment is $(2920+250)/8330=38.1\%$. The spent gas delivered back to oxygenation-activated sludge step contains $$8330-(2920+250)=5200$$

lb. $O_2$/day and can readily be consumed in that step since 8340 lb. $O_2$/day are required for BOD removal.

In a third mode of operation identical to the feed conditions of the foregoing low strength waste water example in all other respects, the ozone generator is "turned down" to produce 1½% $O_3$ in $O_2$ instead of 3% (by volume). Under these conditions, the $O_3$ generator must produce $250/.015=16,650$ lb. $O_2+O_3$/day, of which $$2920+250=3170$$

lb./day will be used in post-treatment, leaving 13,480 lb./day for delivery to the oxygenation-activated sludge step. But since only 8340 lb. $O_2$/day are needed for BOD removal, it is evident that 5140 lb. $O_2$/day is "excess" and will be wasted. This amounts to only about 65% utilization of the total $O_2$ fed to the system, and is considerably less efficient than the other described modes.

In a preferred embodiment of the invention wherein the BOD removed in the oxygenation-activated sludge step is 100–200 p.p.m., the ozone concentration produced in the ozone generation zone is at least 1% (by volume). This relationship insures that substantially all of the oxygen passed to the post-treatment zone and not used therein to increase the effluent's DO content, may be consumed in the oxygenation step. That is, the oxygen requirement of the waste water fed to the oxygenation-activated sludge step will consume substantially all of the oxygen in the spent gas from the post-treatment zone (unlike the aforedescribed third mode of operation).

Figure 3:
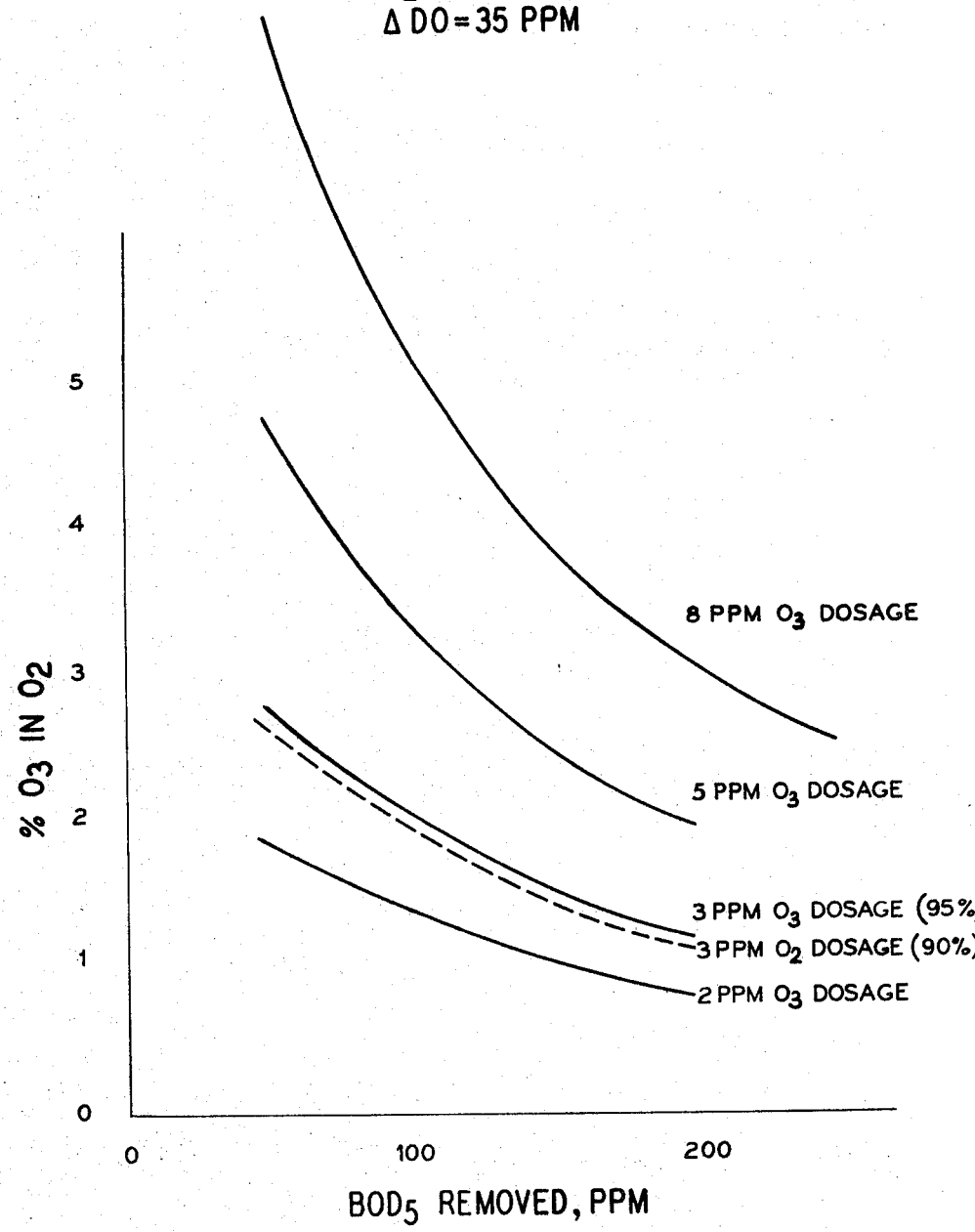
FIG. 3 is a graph illustrating the relationship between the ozone concentration in the oxygen gas used for the post-treatment disinfection step, and the BOD removed in the oxygenation step, at different levels of ozone dissolution in the effluent liquid.
Figure 4:
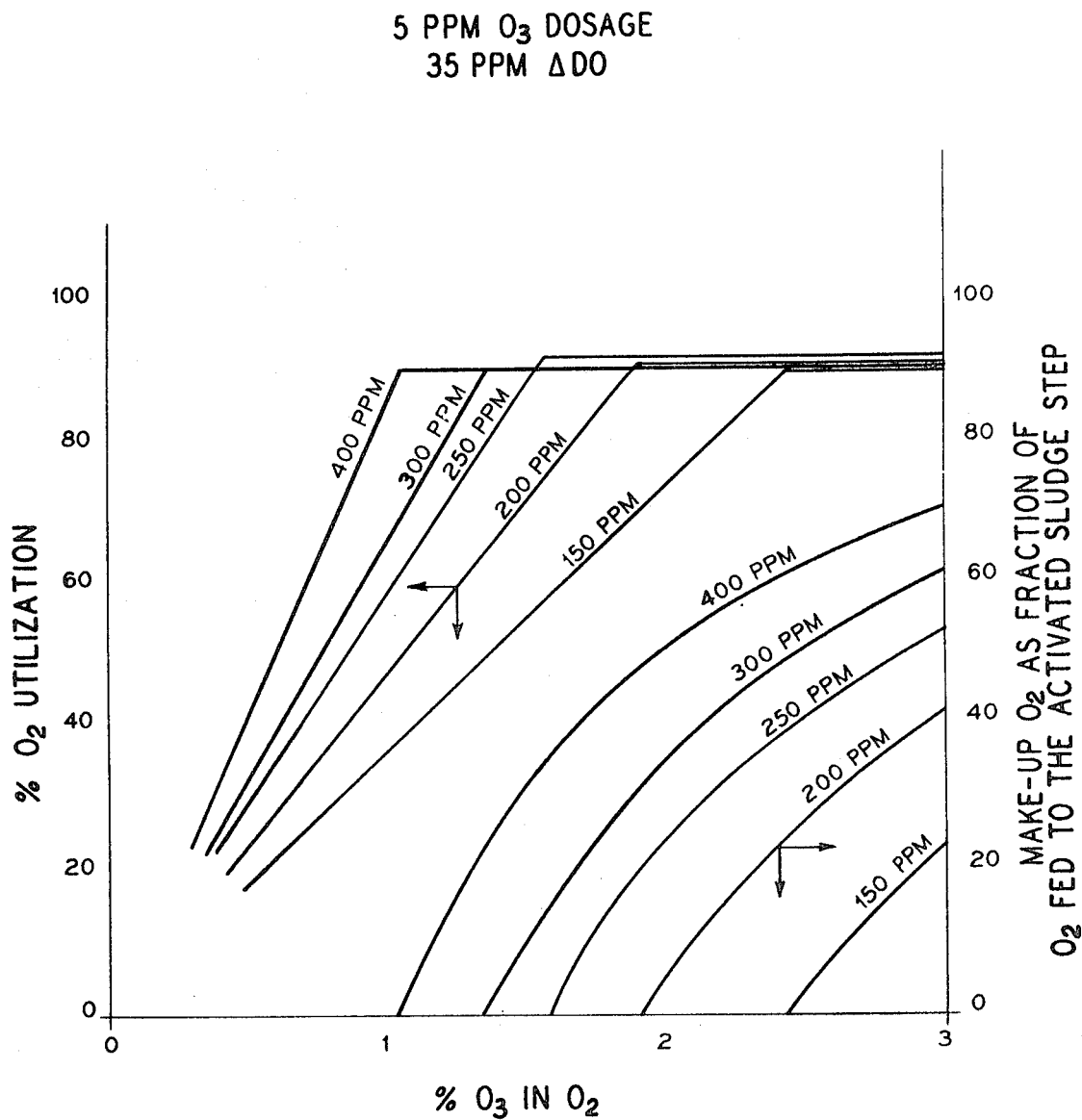
FIG. 4 is a graph illusrtating the relationship between both oxygen utilization and the additional oxygen required in the oxygenation step, and the ozone concentration in the gas fed to the post-treatment disinfection step, at different levels of BOD removal in the oxygenation step.

FIGS. 3 and 4 demonstrate the relationship between the BOD removed in the oxygenation-activated sludge step and the concentration of $O_3$ fed to the post-treatment disinfection step. Referring first to FIG. 3, the curves are for various dosages of $O_3$ between 2 and 8 p.p.m. All but one of the curves are based upon 95% overall utilization of oxygen supplied to the system (as either $O_2$ or $O_3$) and upon obtaining a DO enrichment ($\Delta$DO) of 35 p.p.m. of the effluent in the post-treatment step. That is, the disinfected product water discharged from the post-treatment zone has about 35 p.p.m. higher DO than the clarified effluent entering this zone. The 90% utilization curve at 3 p.p.m. $O_3$ dosage is included to show (by comparison with the 95% utilization—3 p.p.m. $O_3$ curve) that the illustrated relationship are not drastically affected by differences in percentage $O_2$ consumption. That is, the two 3 p.p.m. $O_3$ dosage curves are quite close to each other. Each curve denotes, for that particular $O_3$ dosage, the minimum concentration of $O_3$ which can be supplied from the ozone generator without exceeding $O_2$ needs, i.e. without exceeding $O_2$ which will be transferred into the liquid.

For example, if 200 p.p.m. BOD is being removed in the oxygenation-activated sludge step and if the $O_3$ dosage is 5 p.p.m. in post-treatment, then the O concentration from the generator must be at least 2% $O_3$ in $O_2$, otherwise more $O_2$ will be used as $O_3$ diluent than can subsequently be consumed (at 95% utilization) for BOD removal. The excess $O_2$ will be wasted, since no provision is present in the system for purifying and recirculating the spent gas to the $O_3$ generator. (Only externally supplied gas having at least 75% oxygen is introduced to the ozone generation zone.) When the system is operated directly on one of the $O_3$ dosage curves, the $O_2$ fed to the $O_3$ generator is just sufficient to supply all the $O_2$ needs of the system: for $O_3$ generation, for DO enrichment of the effluent in post-treatment and for BOD removal in oxygenation-activated sludge treatment. Hence, no make-up oxygen needs to be supplied directly from the source to the activated sludge step. When the system is operated so as to introduce a higher $O_3$ concentration gas mixture to the post-treatment than indicated by a curve, less $O_2$ will be available in the spent gas from post-treatment than is needed in the oxygenation step and make-up oxygen will be required.

It is evident from FIG. 3 that with the 4% $O_3$ upper limit on the ozonation gas mixture, low BOD strength waste waters cannot be purified in the oxygenation step and heavily dosed with $O_3$ without wasting $O_2$. By way of illustration, assume 100 p.p.m. $BOD_5$ are to be removed from the waste water and that the $O_3$ dosage in post-treatment is to be 8 parts/$10^6$ parts effluent. This means that to operate directly on the 8 p.p.m. $O_3$ dosage curve (with no $O_2$ waste or deficit), the ozone concentration in the gas mixture fed to the post-treatment should be above 5% $O_3$. But this is highly inefficient in terms of ozone generation and possibly hazardous so that the $O_3$ concentration can be no more than 4% according to this invention. However, at the 8 p.p.m. $O_3$ dosage level and 4% $O_3$, there is sufficient oxygen in the spent gas from the post-treatment to remove about 130 p.p.m. BOD whereas the waste water entering the oxygenation step contains only 100 p.p.m. $BOD_5$ to be removed. This means that the spent gas contains excessive oxygen and a portion thereof must be wasted. FIG. 3 indicates that for a given BOD removal and $O_3$ dosage, the $O_3$ in the gas to the post-treatment should preferably not be less than the appropriate curve. In view of the 2 p.p.m. $O_3$ minimum, low strength wastes of 100–200 p.p.m. BOD should preferably be treated with at least 1% $O_3$ rather than 0.5%, to avoid operation substantially below the dosage curve.

Turning now to FIG. 4, the curves represent various amounts of BOD removal in the oxygenation-activated sludge step, i.e., 150, 200, 250, 300 and 400 p.p.m. BOD. All curves illustrate conditions appropriate for 5 parts ozone dosage per $10^6$ parts effluent, and for 35 p.p.m. DO enrichment in post-treatment. The set of curves read on the left ordinate correlate overally percent $O_2$ utilization in the system (as either $O_2$ or $O_3$) vs. percent $O_3$ delivered by the generator (volume basis). The set of curves read on the right ordinate correlate the amount of make-up $O_2$, expressed as a percentage of the $O_2$ required for the oxygenation-activated sludge step, vs. percent $O_3$ delivered by the generator.

It can be determined from FIG. 4 that for all amounts of BOD removal, $O_2$ utilization remains maximized as long as the make-up $O_2$ flow to the oxygenation step is zero or above. By way of example, consider the 200 p.p.m. BOD removal curves which indicate that about 42% make-up $O_2$ is required with 3% $O_3$ gas entering the post-treatment. As the percent $O_3$ in this gas decreases, the percent make-up $O_2$ also decreases until at about 1.9% $O_3$, the make-up $O_2$ is zero. However, during this entire range of decreasing $O_3$ concentration in the gas mixture, the $O_2$ utilization has remained constant and at the maximum level of about 90%. If the $O_3$ concentration decreases below 1.9% the percent make-up $O_2$ becomes "negative," i.e. the system has more oxygen than required for purification in the oxygenation zone at 90% utilization in that zone, and for disinfection and DO enrichment in the post-treatment zone. The excess must be discarded by venting, either before or after introduction to the oxygenation zone. This of course reduces the percent oxygen utilization in the overall system, as is apparent from the left side curves which drop rapidly as the make-up $O_2$ becomes negative. For example, at 1% $O_3$ the 200 p.p.m. $O_2$ utilization curve has fallen from 90% (at 1.9% $O_3$) to about 60%.

FIG. 4 also reveals that as waste water BOD strengths become lower, the range of permissible $O_3$ concentrations corresponding to maximum $O_2$ utilization becomes narrower. According to FIG. 3, this high $O_2$ utilization range with 5 p.p.m. $O_3$ dosage vanishes at a BOD removal of about 120 p.p.m. if limited to below 3% $O_3$. Curves similar to FIG. 4 for other dosages of $O_3$ would demonstrate the same trend as FIG. 3: that with high $O_3$ dosage, the system cannot operate at high $O_2$ utilization efficiency unless the BOD strength of the waste water is reasonably high.

One of the surprising discoveries of this invention is that contrary to prior art practice, the effluent water from an aeration-activated sludge treatment can be disinfected to acceptable criteria by ozone dosages as low as 2 parts $O_3$ per $10^6$ parts effluent, even in the presence of BOD and COD in appreciable quantities. That is, the ozone dosage need not be so massive as to remove the BOD and COD from the effluent before the latter may be disinfected. This means that any BOD and COD present in the effluent may be oxidized by oxygen in the post-treatment, and the ozone only need be supplied in sufficient concentration to disinfect the effluent. Oxygen of course is much cheaper than ozone, so this discovery has great significance in terms of minimizing the total cost of cleaning and disinfecting waste water.

Another unexpected advantage of this invention is the discoverey that even though the aforementioned ozone dosage is essential in the post-treatment zone and must be supplied in an $O_2$–$O_3$ gas mixture fed thereto, the spent gas discharged from this zone contains virtually no traces of ozone. This is important because the spent gas is flowed to the oxygenation-activated sludge zone as at least the major portion of the oxygen feed gas, and ozone may not be tolerated in this zone as it would kill the bacteria needed for biochemical oxidation.

These advantages were illustrated in a series of tests in which pure oxygen was used to aerate waste water in an activated sludge treatment and the clarified effluent was passed to the top of a vertical tray-type contactor for downward flow against rising ozone-containing gas. In one group of tests (Nos. 1–3) the gas mixture fed to the base of the contactor was $O_2$–$O_3$ and in the other group of tests (Nos. 4–6) the gas mixture was air-$O_3$. Data from these tests is summarized in Table I.

TABLE I

| Test No. | Waste water BOD (p.p.m.) | Effluent BOD (p.p.m.) | Effluent COD (p.p.m.) | $O_3$ to post treatment (vol. percent) | $O_3$ dosage (p.p.m.) | Coliforms (No./100 ml.) In | Coliforms (No./100 ml.) Out | Dissolved oxygen (p.p.m.) In | Dissolved oxygen (p.p.m.) Out |
|---|---|---|---|---|---|---|---|---|---|
| 1 | 95–100 | 9.0 | 30 | 0.55 | 2.00 | $7.4 \times 10^4$ | $1.6 \times 10^3$ | 0.9 | 44.4 |
| 2 | 95–100 | 13.0 | 30 | 1.33 | 5.00 | $3.3 \times 10^4$ | $1.0 \times 10^3$ | 0.5 | 45.1 |
| 3 | 95–100 | 10.5 | 31 | 2.28 | 8.00 | $4.2 \times 10^4$ | $4.5 \times 10^1$ | 0.6 | 38.7 |
| 4 | 70–80 | 11.0 | 34 | 0.27 | 2.00 | $3.9 \times 10^5$ | $3.3 \times 10^3$ | 1.3 | 12.0 |
| 5 | 70–80 | 11.0 | 28 | 0.66 | 5.00 | $4.4 \times 10^5$ | $4.0 \times 10^1$ | 2.8 | 12.3 |
| 6 | 70–80 | 10.5 | 33 | 1.06 | 8.00 | $3.7 \times 10^5$ | $1.5 \times 10^1$ | 1.5 | 12.8 |

The spent gas from the ozonation post-treatment step was periodically analyzed during these tests and contained no ozone when the $O_3$ dosage was 2 and 5 p.p.m. (e.g. test Nos. 1, 2, 4 and 5). This gas did contain ozone traces when the ozone dosage in the effluent was increased to 8 p.p.m. (e.g. test Nos. 3 and 6) but this was attributed to the relatively inefficient vertical tray-type contactor. Such traces would be eliminated in a multi-stage contactor of the types illustrated in FIGS. 1 and 2 as item 29.

Table I indicates that the low ozone dosage of 2 parts $O_3/10^6$ parts effluent (test Nos. 1 and 4) was adequate to reduce the coliform count from an unacceptable level ($7.4 \times 10^4$) to a level suitable for disinfected product introduction into a public water body ($1.6 \times 10^3$). Test No. 3 indicates that the highest ozone dosage of 8 parts $O_3/10^6$ parts effluent was sufficient to reduce the coliform count to a level suitable for use as disinfected product as drinking water. A comparison of the $O_2$–$O_3$ gas and air-$O_3$ gas mixture tests at comparable $O_3$ dosages of 2 p.p.m. (test Nos. 1 and 4), 5 p.p.m. (test Nos. 2 and 5), and 8 p.p.m. (test Nos. 3 and 6) demonstrate that the post-treatment DO was increased about three times higher by the former than the latter. This indicates that the present invention may be used to greatly increase the effluent's dissolved oxygen content and thereby significantly improve the quality of the water body receiving this disinfected product. In contrast, only limited improvement may be attained by feeding an air-$O_3$ mixture to the post-treatment.

Although preferred embodiments of this invention have been described in detail, it will be appreciated that other embodiments are contemplated along with modifications of the disclosed features, as being within the scope of the invention.

What is claimed is:

1. A method for oxygenating and ozonating BOD-containing waste water for biochemical oxygenation and disinfection thereof comprising:
   (a) mixing said waste water with activated sludge and feed gas comprising at least 60% oxygen (by volume) in an oxygenation zone and for sufficient duration to form oxygenated liquor;
   (b) discharging from said oxygenation zone, waste gas containing 20–70% oxygen (by volume) comprising no more than 40% (by volume) of the total oxygen fed to said oxygenation zone and an ozone generation zone, and said oxygenated liquor;
(c) separating said oxygenated liquor into effluent and sludge, and recycling at least part of the latter to the oxygenation zone as said activated sludge;
(d) introducing only externally supplied gas having at least 75% oxygen (by volume) to said ozone generation zone and forming sufficient ozone therein to produce a gas mixture containing 0.5–4% ozone (by volume);
(e) mixing said effluent and the ozone-oxygen gas in a post-treatment zone for 2.5–20 minutes effluent residence time and in relative quantities such that at least 2 parts ozone are dissolved per $10^6$ parts effluent by weight;
(f) discharging disinfected product water from said post-treatment zone having 10–60 p.p.m. higher dissolved oxygen content than said effluent from said oxygenation zone; and
(g) discharging spent gas from said post-treatment zone which is substantially ozone-free and comprises at least 60% oxygen (by volume) and introducing at least part of said spent gas to said oxygenation zone as at least the major quantity portion of oxygen in said feed gas.

2. A method according to claim 1 wherein 100–200 p.p.m. BOD is to be removed from said waste water in said oxygenation zone, and the ozone-oxygen gas mixed with said effluent in the post treatment zone contains at least 1% ozone (by volume).

3. A method according to claim 1 wherein said spent gas provides all of the oxygen in said feed gas to said oxygenation zone.

4. A method according to claim 1 wherein additional make-up gas comprising at least 60% oxygen (by volume) is introduced to said oxygenation zone along with said spent gas as said feed gas.

5. A method according to claim 1 in which said oxygenation zone comprises a multiplicity of separate stages with oxygen-containing gas and liquor being mixed in each stage and separately cocurrently flowed to the next stage for additional mixing therein and with said oxygenated liquor and waste gas being discharged from the final mixing stage; and wherein said post-treatment zone comprises a multiplicity of separate stages with said effluent and ozone-oxygen gas being mixed in each stage and separately countercurrently flowed to succeeding stages for additional mixing therein with said effluent being introduced to and said spent gas discharged from a first stage, and the ozone-oxygen gas mixture from said ozone generation zone being introduced to and said disinfected product water discharged from the highest stage.

6. A method according to claim 1 wherein the externally supplied gas introduced to said ozone generation zone comprises at least 85% oxygen (by volume), said spent gas comprises at least 70% oxygen (by volume), and said waste gas comprises no more than 30% (by volume) of the total oxygen fed to said oxygenation zone and said ozonation zone.

7. A method according to claim 1 wherein said gas mixture produced in said ozone generation zone contains 1–3% ozone (by volume).

8. A method according to claim 1 wherein said oxygenation zone comprises a first section wherein said waste water, activated sludge and a first part of said feed gas are mixed for only sufficient time for BOD adsorption by biomass therein to form partially oxygenated liquor; said partially oxygenated liquor is separated into said effluent and BOD-enriched sludge; said BOD-enriched sludge is mixed with a second part of said feed gas in a second section of said oxygenation zone for sufficient time for the sludge to assimilate the BOD and form said activated sludge, said first and second parts of said feed gas each comprising at least in part said spent gas.

9. A method according to claim 1 in which the ozone dosage in the effluent during the post-treatment mixing of (e) is only sufficient to disinfect said effluent.

10. A method according to claim 1 in which the effluent residence time in the post-treatment mixing of (e) is not more than 0.33 of the liquor residence time in the oxygenation zone mixing of (a).

11. A method according to claim 1 in which said disinfected product water discharged from said post-treatment zone in (f) has 10–40 p.p.m. higher dissolved oxygen content than said effluent from said oxygenation zone.

12. A method according to claim 1 in which 2–8 parts ozone are dissolved per $10^6$ parts effluent by weight, during the post-treatment mixing of (e).

13. Apparatus for oxygenating and ozonating BOD-containing waste water for biochemical oxygenation and disinfection thereof comprising:
(a) an oxygenation chamber having a gas-tight cover;
(b) separate means for introducing oxygen feed gas, waste water and activated sludge to chamber (a);
(c) means for mixing said oxygen feed gas, waste water and activated sludge in chamber (a) to form oxygenated liquor;
(d) means for withdrawing oxygenated liquor from chamber (a);
(e) clarifier means joined to withdrawal means (d) for separating said oxygenated liquor into effluent and sludge;
(f) means for withdrawing said sludge from clarifier means (e) being joined to separate means (b) for introducing activated sludge to chamber (a);
(g) means for venting waste gas from oxygenation chamber (a);
(h) external oxygen gas supply means;
(i) ozone generation means;
(j) conduit means joining (h) to (i) such that external oxygen supply comprises the sole oxygen supplied to said ozone generation means;
(k) liquid-gas contact means, means for passing ozone-oxygen gas mixture from ozone generation means (i) thereto, and means for passing effluent from clarifier means (e) thereto for contact therein;
(l) means for discharging disinfected product water from liquid-gas contact means (k); and
(m) means for discharging spent oxygen-containing gas from liquid-gas contact means (k) being joined to separate means (b) for introducing oxygen feed gas to chamber (a).

14. Apparatus according to claim 13 wherein a bypass conduit is provided between said external oxygen gas supply means (h) and said separate means (b) for introducing oxygen feed gas to chamber (a).

15. Apparatus according to claim 13 wherein liquid-gas contact means (k) comprises a multiplicity of separate compartments with said means of (k) for passing said effluent to means (k) being joined to a first compartment thereof and said means (m) for discharging spent oxygen-containing gas from means (k) also being joined to said first compartment; said means of (k) for passing ozone-oxygen gas mixture to contact means (k) being joined to a final compartment thereof and said means (l) for discharging disinfected product water also being joined to said final compartment; and means for progressively flowing said effluent from said first compartment through any intermediate compartments to said final compartment, and countercurrently flowing ozone-oxygen gas from said final compartment through any intermediate compartments to said first compartment for staged contact therebetween.

16. Apparatus according to claim 13 wherein the liquid capacity of liquid-gas contact means (k) is no more than 0.33 of the liquid capacity of oxygenation chamber (a).

(References on following page)

References Cited

UNITED STATES PATENTS

| | | | |
|---|---|---|---|
| 1,286,017 | 11/1918 | Jones | 210—15 X |
| 2,380,465 | 7/1945 | Proudman | 210—220 X |
| 2,948,677 | 8/1960 | Austin et al. | 210—15 X |
| 3,054,602 | 9/1962 | Proudman | 210—15 X |
| 3,133,017 | 5/1964 | Lambeth | 210—15 X |
| 3,276,994 | 10/1966 | Andrews | 210—63 X |
| 3,342,727 | 9/1967 | Bringle | 210—220 X |
| 3,356,609 | 12/1967 | Bruemmer | 210—7 |
| 3,401,113 | 9/1968 | Pruessner et al. | 210—15 X |
| 3,412,017 | 11/1968 | Abson et al. | 210—7 |
| 3,505,213 | 5/1970 | Anthony et al. | 210—15 |

FOREIGN PATENTS

| | | |
|---|---|---|
| 415,775 | 9/1934 | Great Britain. |

OTHER REFERENCES

Grant, S., et al., The Oxygen Requirements of the Activated Sludge Process, Sewage Works Journal, April 1930, vol. 2, pp. 228–244 (P.O.S.L.).

Weston, R. F., et al., Contact-Stabilization Activated Sludge Treatment for Pulp and Paper Mill Waste, Tappi, March 1962, vol. 45, No. 3, pp. 223–227.

Robbins, M. H. Jr., Use of Molecular Oxygen in Treating Semi-Chemical Pulp Mill Wastes, Proc. 16th Ind. Waste Conf., Purdue U., March 1962, pp. 304 and 308.

Pfeffer, J. T., et al., Oxygen-Enrich Air for Biological Waste Treatment, Water and Sewage Works, vol. 112, October 1965, pp. 381–384.

MICHAEL ROGERS, Primary Examiner

U.S. Cl. X.R.

210—7, 15, 63, 96, 103, 192, 195, 220